United States Patent [19]

Stultz et al.

[11] Patent Number: 5,635,077
[45] Date of Patent: Jun. 3, 1997

[54] AMMONIA REMOVAL

[75] Inventors: Jeffrey H. Stultz, Freeport; Danford L. Bice, Lake Jackson, both of Tex.

[73] Assignee: The Dow Chemical Company, Midland, Mich.

[21] Appl. No.: 469,796

[22] Filed: Jun. 6, 1995

Related U.S. Application Data

[63] Continuation of Ser. No. 55,158, Apr. 29, 1993, abandoned.

[51] Int. Cl.$^6$ .................... C02F 1/06; C02F 1/08; C02F 1/20

[52] U.S. Cl. ............... 210/750; 95/263; 95/266; 210/613; 210/743; 210/739; 210/903

[58] Field of Search .................. 210/750, 903, 210/613, 739, 743; 95/263, 265, 266; 203/20, 49, 39, 88, 89, 1; 159/48.1; 423/237, 356

[56] References Cited

U.S. PATENT DOCUMENTS

| | | | |
|---|---|---|---|
| 484,823 | 10/1892 | Scruby . | |
| 800,187 | 9/1905 | Venable . | |
| 2,172,646 | 9/1939 | Walker | 261/112 |
| 2,183,657 | 12/1939 | Page | 210/7 |
| 2,758,875 | 8/1956 | Loveless | 299/69 |
| 2,809,933 | 10/1957 | Halvorson | 210/16 |
| 2,992,986 | 7/1961 | Ingram | 210/17 |
| 3,192,155 | 6/1965 | Bready et al. | 210/705 |
| 3,231,490 | 1/1966 | Fry | 210/17 |
| 3,303,106 | 2/1967 | Standiford | 203/27 |
| 3,329,271 | 7/1967 | Ward et al. | 210/150 |
| 3,341,450 | 9/1967 | Ciabattari et al. | 210/63 |
| 3,371,033 | 2/1968 | Simmons et al. | 210/3 |
| 3,468,795 | 9/1969 | Bye-Jorgensen | 210/7 |
| 3,730,881 | 5/1973 | Armstrong | 210/519 |
| 3,898,058 | 8/1975 | McGill | 95/248 |
| 3,920,419 | 11/1975 | Schroeder et al. | 95/263 |
| 3,929,586 | 12/1975 | Slikkers et al. | 210/751 |
| 3,953,326 | 4/1976 | Reimann | 210/7 |
| 3,960,717 | 6/1976 | Wyatt | 210/6 |
| 3,977,972 | 8/1976 | Bloch et al. | 95/245 |
| 3,981,800 | 9/1976 | Ort | 210/6 |
| 4,017,421 | 4/1977 | Othmer | 252/416 |
| 4,093,544 | 6/1978 | Ross | 95/266 |
| 4,129,502 | 12/1978 | Garrett et al. | 210/60 |
| 4,160,725 | 7/1979 | Josis et al. | 210/21 |
| 4,321,410 | 3/1982 | Ono et al. | 564/67 |
| 4,367,146 | 1/1983 | Pollock et al. | 210/608 |
| 4,421,534 | 12/1983 | Walker | 55/73 |
| 4,541,986 | 9/1985 | Schwab et al. | 422/5 |
| 4,613,697 | 9/1986 | Pagani | 564/67 |
| 4,689,156 | 8/1987 | Zibrida | 210/747 |
| 4,735,723 | 4/1988 | Mulder | 210/603 |
| 4,778,490 | 10/1988 | Pollert | 95/266 |
| 4,832,848 | 5/1989 | Velebil et al. | 210/617 |
| 4,839,052 | 6/1989 | Maree | 210/603 |
| 4,894,162 | 1/1990 | Cournoyer et al. | 210/603 |
| 5,200,065 | 4/1993 | Sinclair et al. | 210/104 |
| 5,217,624 | 6/1993 | Yamane et al. | 210/751 |
| 5,234,606 | 8/1993 | Kazama et al. | 210/748 |
| 5,234,607 | 8/1993 | Brandenburg et al. | 210/761 |
| 5,236,557 | 8/1993 | Müller et al. | 210/903 |

FOREIGN PATENT DOCUMENTS

| | | | |
|---|---|---|---|
| 0029536 | 6/1981 | European Pat. Off. | 210/750 |
| 3714591 | 11/1987 | Germany | 95/266 |
| 2202167 | 3/1987 | United Kingdom | 55/53 |

OTHER PUBLICATIONS

"Texas Operations Wastewater Treatment Plant Dow U.S.A." Mar. 1992.

*Primary Examiner*—Virginia Manoharan

[57] ABSTRACT

A method for stripping ammonia from a film of digested sludge including flowing alkaline liquid sludge as a film on a tower's interior wall and flowing an ammonia stripping gas past the film creating a vapor containing ammonia and stripping gas; then disengaging the liquid sludge from the vapor in a tower disengaging zone.

18 Claims, 2 Drawing Sheets

AMMONIA REMOVAL

This is continuation of application Ser. No. 08/055,158 filed on Apr. 29, 1993, now abandoned.

BACKGROUND OF THE INVENTION

1. Field of the Invention

This invention is directed to removal of ammonia compounds from materials and, in one aspect, to removal of ammonia from sludge.

2. Description of Related Art

In the treatment of wastewater, sludges are generated by the clarification of incoming wastewater to remove solids that are either inert or are too large to be easily biodegraded. Such solids can cause mechanical problems with downstream equipment. Primary sludges are generally gritty and odorous.

Denatured, primary, digested or secondary sludge consists of excess microbial mass generated as a result of a biological treatment process. During certain sludge digestion processes, a portion of the microbes decomposes to organic compounds, phosphorous and nitrogen in the form of ammonia. Such sludges and dewatered solids may have undesirably high levels of ammonia.

A variety of previous patents describe various apparatuses and processes. U.S. Pat. No. 4,984,162 describes a method of collecting vented material from vessels containing raw wastewater and volatile compounds that would normally escape to the atmosphere since these vessels normally have an open top. The vented material and air are pumped to an aerobic sludge reactor where the volatile and odorous compounds are destroyed by bacteria in the reactor and remaining biologically inert gas then degasses to the atmosphere.

U.S. Pat. No. 4,966,706 describes adding peracid to a sludge generated in a wastewater treatment plant to kill parthenogenic microorganisms and worm eggs. The peracid treated sludge is then digested in an anaerobic septic tank which generates methane that is burned to produce usable energy. The digested sludge can be used as fertilizer.

British patent application U.K. 2,202,167 describes a process for removing dissolved gasses from a liquid, particularly oxygen from water, using a static mixer and mentions removing volatile compounds from wastewater. The patent describes a separation tank where the gasses separate from the liquid without agitation.

Japanese Patent 53-144463 describes a process for removing gas from water using two ejectors and degassing tanks in series. This is similar to the previous patent except an ejector is used instead of a static mixer. Both devices are similar in that they mix a stripping gas with the liquid.

U.S. Pat. No. 4,160,725 describes a nonbiological steam stripper for removing ammonium and phenolic compounds from coke oven wastewater.

U.S. Pat. No. 4,508,545 describes a system using stripping gasses from wastewater in a packed tower and a gas scrubber so the stripping gas can be recycled.

U.S. Pat. No. 4,655,935 describes a process for detoxifying wastewater from dithiocarbamate manufacturing that includes air stripping the water.

British Patent U.K. 2,093,727 describes a method for enhanced thickening of anaerobically digested sludge. The sludge after digestion contains entrained methane. By stripping the sludge with a gas and degassing, the sludge thickens in a gravity settler.

There has long been a need for an effective and efficient method for the reduction of sludge ammonia content.

SUMMARY OF THE PRESENT INVENTION

In one embodiment of the present invention primarily directed to removal of ammonia from digested liquid sludge, denatured sludge with an undesirable ammonia content is fed to a stripping tower, preferably through a nonclogging spray nozzle which creates a thin film flowing down an interior wall of the tower. The sludge flows down into a holding vessel at the bottom of the tower with an agitator therein. A stripping gas flows into the holding vessel under pressure. Preferable stripping gases or vapors are nitrogen, air, or steam. The gas rises in the tower, stripping ammonia from the downflowing liquid sludge. Liquid disengages from the upflowing stripping vapor in a vapor-liquid disengaging zone in a top of the tower. The separated vapor then is vented through a vent at the top of the tower. As desired, this method can then be run as a batch-wise continuous process by recycling the liquid to the initial feed to reduce the ammonia content to a desired level.

It is, therefore, an object of at least certain preferred embodiments of the present invention to provide:

New, useful, unique, efficient, non-obvious devices and methods for removing ammonia from sludge.

Such methods and devices which employ a tower according to this invention as described herein; and the tower itself; and Such devices and methods for reducing the ammonia content of digested sludge;

Such devices and methods which produce a product which may be exposed to the atmosphere without harmful effects; and Such devices and methods which provide nutrient ammonia control for biological treatment facilities.

This invention resides not in any particular individual feature, but in the combinations of them herein disclosed and claimed and it is distinguished from the prior art in these combinations with their structures and functions. There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that the conceptions, upon which this disclosure is based, may readily be utilized as a basis for the designing of other structures, methods and systems for carrying out the purposes of the present invention. It is important, therefore, that the claims be regarded as including any legally equivalent constructions insofar that they do not depart from the spirit and scope of the present invention.

The present invention recognizes and addresses the previously mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

So that the manner in which the above-recited features, advantages and objects of the inventions, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
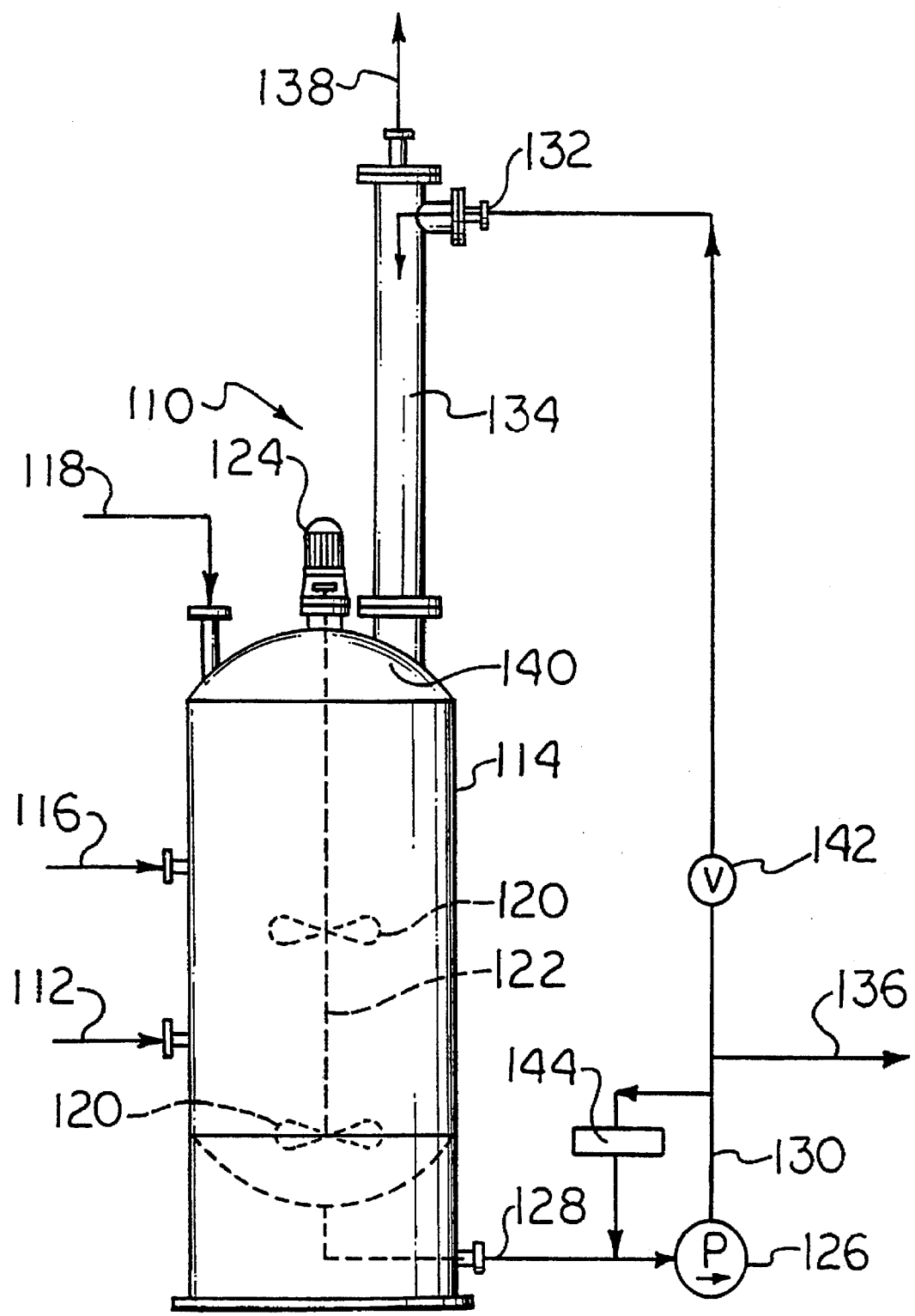
FIG. 1 is a schematic view of a process according to the present invention.

In a process 110 illustrated schematically in FIG. 1 alkaline digested denatured sludge with an undesirable ammonia content is flashed (i.e. system pressure is reduced to such a point that the liquid sludge boils generating gas) via line 112 into a reaction tank 114, filling the tank 114 with e.g. about 6000 gallons of sludge having an ammonia content of about 6000 ppm or 0.6% by weight. Stripping gas is generated by this flashing step in which system pressure is lowered.

Via a line 116 aqueous sodium hydroxide is fed into the tank 114 to bring the pH of the contents to about 9.0 or more. A gas, preferably steam, air, or nitrogen flows under pressure via line 118 into the tank 114 to provide additional gaseous stripping medium to strip ammonia from the liquid sludge. The contents of the tank 114 are vigorously agitated by one or more impellers 120 on a rotable shaft 122 rotated by a motor 124.

A pump 126 pumps material from the tank 114, preferably at a rate of about 200 gallons per minute through lines 128, 130, and 132 to a stripping tower 134. When a stripping is completed, the material pumped through the line 130 exits the system in line 136 as treated product with a desirable ammonia level. Undesirable volatiles exit the tower 134 in a vent line 138. Sludge flows in a film down through the tower 134, through an outlet 140, and back into the tank 114. An on-stream analyzer 141 in line 130 measures and indicates ammonia level and pH returning sampled material to the line 128. When a desired ammonia level is achieved, e.g. 0.1% ammonia by weight, a valve 142 is closed so that treated material flows to line 136.

Conditions and components of the materials in the flow lines of FIG. 1 for one particular process are listed in Table I:

TABLE I

| Line | | 112 | 136 | 138 | 116 | 118 |
|---|---|---|---|---|---|---|
| Temperature, °F. | | 235 | 212 | 212 | 86 | 86 |
| Pressure, psia | | 24.7 | 15.2 | 15.2 | 60.0 | 60.0 |
| COMPONENTS | MW | | | | | |
| $H_2O$ | 18 | 17,422 | 19,923 | 436 | 2937 | |
| $NH_3$ | 17 | 111.8 | 22.4 | 89.4 | 0 | |
| $CO_2$ | 44 | 3.8 | 3.8 | Trace | 0 | |
| NaOH | 40 | 0 | 305 | 0 | 305 | |
| $N_2$ | 28 | 0 | Trace | 196 | 0 | 196 |
| NaCl | 58.5 | 279 | 851 | 0 | 572 | |
| $H_3PO_4$ | 98 | 71.7 | 71.7 | 0 | 0 | |
| VSS | 116 | 104.7 | 104.7 | 0 | 0 | |
| FSS | 100 | 146.2 | 146.2 | 0 | 0 | |
| ORGANICS | 72 | 438.3 | 437.1 | 1.2 | 0 | |
| $HNO_3$ | 63 | 0.5 | 0.5 | 0 | 0 | |
| HCL | 36.5 | 167.7 | 167.7 | 0 | 0 | |
| TOTAL, LBS. | | 18,745 | 22,033 | 722 | 3814 | 196 |

"VSS" is biomass or volatile suspended solids; "FSS" is inerts or fixed suspended solids, e.g. silicates and phosphates; and "ORGANICS" are hydrocarbons which are products of sludge digestion, e.g. solubilized and partially oxidized VSS such as acetates and aldehydes.

Table I presents data for a batch operation. Ammonia removal would be about 15% by weight of the amount of ammonia in the initially entering sludge, for a continuous system, i.e. for a continuous single stage flash operation achieved by introducing feed continuously from a sludge digester at about 10 p.s.ig. to a tower at a pressure of about 0.5 p.s.i.g. at an adjusted pH, e.g. about 11, preferably without additional stripping gas. By operating in a batch mode, the digested sludge and liquor can be recirculated through the stripper tower again and again while adding nitrogen or steam to displace the water vapor and ammonia and to maintain tank pressure until ammonia removals of 99+% are achieved. If the amount of ammonia to be removed to meet the outfall requirements does not demand 99% removal, then the amount of nitrogen, steam, recirculation time and pH adjustment can be reduced according to the ammonia removal desired. Therefore, the ammonia removal according to this invention can be varied from 0 to 99+%.

Figure 2:
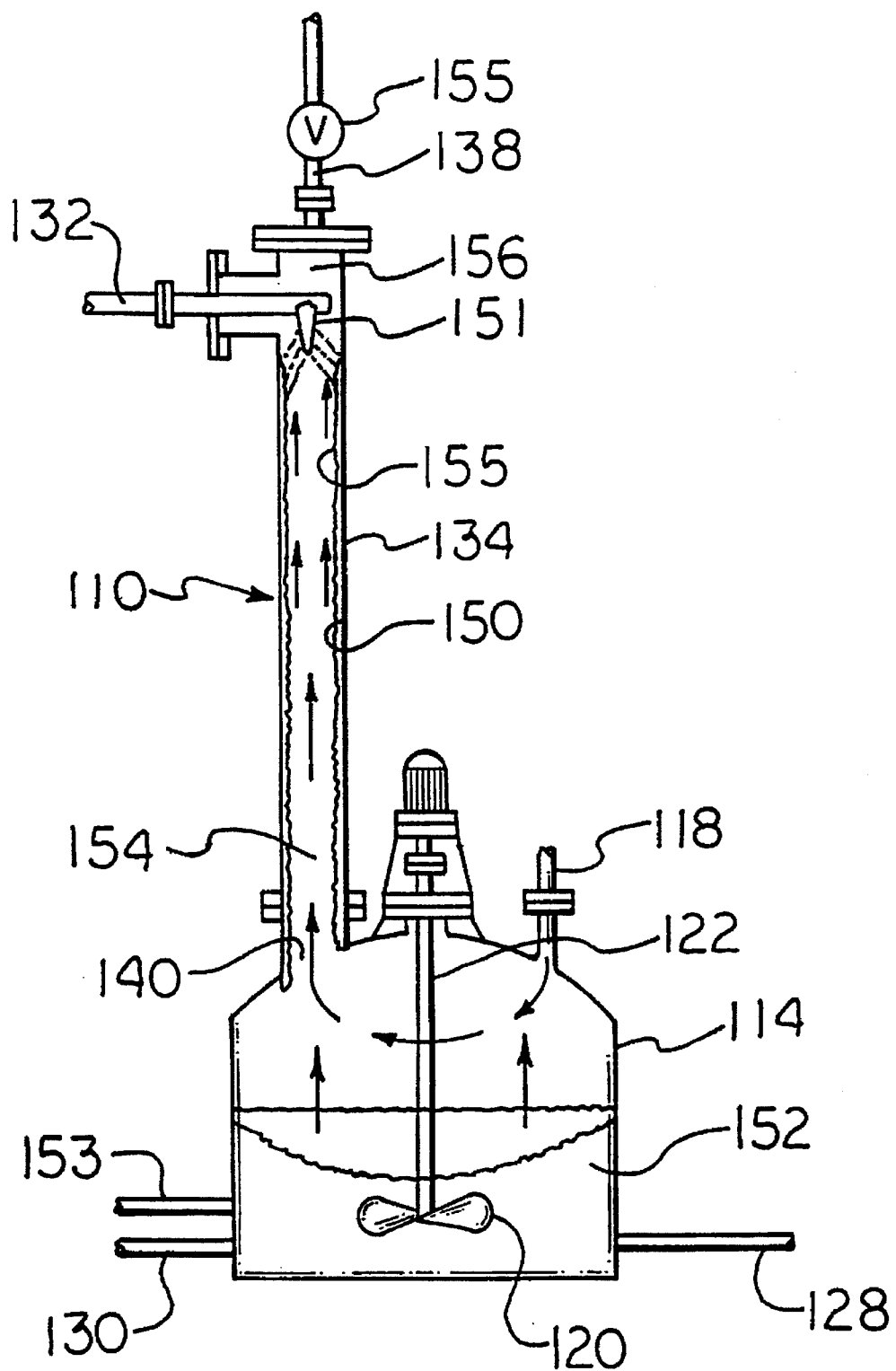
FIG. 2 is a schematic view of a tower useful in a process according to the present invention.

FIG. 2 presents a cross-sectional view of the tower 134 in detail. As shown in FIG. 2, in the process 110 denatured digested sludge enters a tower 134 in a line 132 and is sprayed onto an inner surface 150 of the tower interior by a nozzle 151 to form a film 155 descending down the surface 150. Stripping gas from two sources is fed into the tank 114 to strip ammonia evolving from liquid sludge 152 in the tank 114: first stripping steam from the flash of feed sludge enters the tank through a feed line 153; second additional stripping gas, e.g. nitrogen is added, if desired, through the line 118. The stripping gases 154 rise in the tower (which is operated at a positive pressure) to the vent line 138. Tower pressure is controlled with a valve 155 in line 138. A vacuum may be applied to line 138, e.g. at a level, about five to six inches of water; or the tank may be operated at a positive pressure. Liquid sludge disengages from the rising vapor in a gas-liquid disengaging zone 156. Stripped sludge may be recycled from the tank 114 to the line 132 via a recycle line 130 with the pump 126. (FIG. 1) By using the tower 134 in a batch-wise continuous embodiment of the process 110, the ammonia level of a batch of sludge can be reduced to any desired level. Since this is a batch process, the pressure may be progressively lowered to produce stripping steam. By eliminating foaming and sticking problems in the tower 134 and the tank 114 due to the use of no tower internals, a relatively small gas-liquid disengaging zone 156 may be used and preferable and counter current operation is effective. For the specific system described this zone is about two feet in diameter and two feet high.

In certain processes according to this invention it is preferred that there be no internal devices in the tower below the sludge distributor; that no chemical reactions occur in the tower; that the process be a batch-wise continuous batch recycle process; that high wash rates, e.g. 5000 to 20,000 pounds per hour per foot of tower periphery, be maintained on the interior tower surface so that areas in the tower do not dry out and so solids do not build up on the interior tower surface producing inactive areas for stripping.

In one embodiment in a system and method according to this invention a stripper tower has a sludge flow rate of 500 pounds per hour or more of wetted periphery foot of tower periphery with a tower of 2 foot diameter, or per about 6.28 square feet/foot of height of filming surface, and most preferably between about 5000 and about 20,000 pounds per hour per foot, thus providing a uniform film with little or no streaking or solids buildup and desirable continuous renewal of the film surface. Recycled sludge (e.g. via line 128 to line 132) assists in maintaining filming rate within the tower and in batch operations.

It is within the scope of this invention for the stripping gas to enter the tower in either cocurrent or countercurrent flow with respect to the sludge; but upward gas flow and downward sludge flow are preferred. It is preferred that air flow be 0.1 cubic foot or more per gallon of entering sludge or, most preferably, between about 0.2 to about 10 cubic feet of air per gallon of entering sludge. It is preferred that stripper gas residence time in the tower be 5 seconds or more and, most preferably, about 10 to about 20 seconds. Higher gas introduction rates, although possible, may be limited by the size of the tank vent and size of the area of the disengaging zone 156. A suitable agitator is a Lightnin Model 74SI with two forty-five inch diameter A310 impellers rotated at forty-five and eight tenths r.p.m. by a one horsepower motor.

In one example of a process according to this invention using the described process and equipment, two samples of digested sludge containing 1460 ppm ammonia were pH adjusted to 12 with sodium hydroxide in ten minutes. Then the samples were boiled and air stripped. The ammonia concentrations were reduced to 37 ppm and 14 ppm after correcting for dilution and evaporation. In another example, two samples of digested sludge containing 1460 ppm ammonia were pH adjusted to 9.5 with magnesium hydroxide in 4.5 hours. Then the samples were boiled and air stripped. The ammonia concentrations were reduced to 70 ppm and 44 ppm after correcting for dilution and evaporation.

Based on time alone, sodium hydroxide is preferred due to the much shorter time to reach the target pH, 10 minutes versus 4.5 hours. Even at 9.5 pH the ammonia removal is still sufficient to avoid the buildup of excess ammonia.

Filed on even date herewith are the following applications, co-owned with this appliation, whose subject matter is hereby disclosed herein and which may be employed with the present invention in a material treatment system (invention titles followed by applicant(s)):

"Sludge Digestion;" U.S. Ser. No. 08/055,159; J. Stultz, D. Bice;

"Sludge Deodorization;" U.S. Ser. No. 08/055,157; J. Stultz, D. Bice;

"Tank Foundation;" U.S. Ser. No. 08/055,152 J. Stultz;

"Pipe To Concrete Transition;" U.S. Ser. No. 08/055,153; J. Stultz;

"Slab Joint Liquid Stop;" U.S. Ser. No. 08/055,156; J. Stultz;

"Sludge Clarifier Bottom;" U.S. Ser. No. 08/055,161; J. Stultz, H. Rabren;

"Sludge Clarifier Roof;" U.S. Ser. No. 08/055,154; J. Stultz;

"Hopper Liner;" U.S. Ser. No. 08/055,155; J. Stultz;

"Waste Gas Incineration;" U.S. Set. No. 08/055,160; J. Stultz, D. Bice

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A method for removing ammonia from liquid sludge containing ammonia and suspended solids, the method comprising flowing the liquid sludge to an interior wall of an interior of a hollow stripping tower forming a flowing film of sludge on the interior wall, with the tower being at a positive pressure and with liquid sludge being supplied to the tower such that a wash rate is maintained in the tower of at least 5000 pounds per hour per foot of stripping tower periphery, flowing stripping gas past the film, stripping ammonia from the liquid sludge into the stripping gas, and disengaging liquid sludge from the stripping gas in a disengaging zone in the stripping tower, producing disengaged liquid sludge, flowing the stripping gas upwardly in the stripping tower, and flowing the liquid sludge downwardly in the stripping tower.

2. The method of claim 1 further comprising prior to flowing the liquid sludge to the tower feeding the liquid sludge to a tank which is in fluid communication with the stripping tower, agitating the liquid sludge in the tank, and then feeding the liquid sludge to the stripping tower.

3. The method of claim 2 further comprising flashing the liquid sludge into the tank producing stripping gas for the stripping tower.

4. The method of claim 2 further comprising adjusting the pH of the liquid sludge in the tank.

5. The method of claim 4 further comprising adjusting the pH to at least 9.

6. The method of claim 2 further comprising pumping the liquid sludge from the tank.

7. The method of claim 1 wherein the sludge is digested denatured liquid sludge.

8. The method of claim 1 further comprising venting stripping gas containing ammonia stripped from the liquid sludge in the stripping tower, through a vent in communication with the stripping tower interior.

9. The method of claim 8 further comprising discharging the disengaged liquid sludge from the stripping tower and recycling the disengaged liquid sludge back to the stripping tower for further stripping of ammonia.

10. The method of claim 9 wherein at least 99% by weight of the ammonia initially present in the liquid sludge fed to the stripping tower is removed by means of the vented stripping gas.

11. The method of claim 8 wherein at least about 15% by weight of the ammonia present in the liquid sludge fed to the stripping tower is removed by means of the vented stripping gas.

12. The method of claim 1 further comprising sensing ammonia concentration level of the disengaged liquid sludge and pH thereof.

13. The method of claim 1 further comprising flowing the liquid sludge to the interior wall of the stripping tower with a sludge distributor, and inhibiting foaming and sticking in the stripping tower by having no internal devices in the stripping tower below the sludge distributor.

14. The method of claim 1 which is characterized by a stripping gas residence time in the stripping tower of at least 5 seconds.

15. The method of claim 14 wherein the residence time is between about 10 to about 20 seconds.

16. A method for removing ammonia from liquid sludge containing ammonia and suspended solids, the method comprising flowing the liquid sludge to an interior wall of an interior of a stripping tower forming a flowing film of sludge on the interior wall, with the tower being at a positive pressure and with liquid sludge being supplied to the tower such that a wash rate is maintained in the tower of at least 5000 pounds per hour per foot of stripping tower periphery, flowing stripping gas past the film, stripping ammonia from the liquid sludge into the stripping gas, and disengaging liquid sludge from the stripping gas in a disengaging zone in the stripping tower, producing disengaged liquid sludge, flowing the stripping gas upwardly in the stripping tower, flowing the liquid sludge downwardly in the stripping tower, flowing the liquid sludge to the interior wall of the stripping tower with a sludge distributor, and inhibiting foaming and sticking in the stripper tower by having no internal devices in the stripping tower below the sludge distributor.

17. The method of claim 16 which is characterized by a stripping gas residence time in the stripping tower of at least 5 seconds.

18. A method for removing ammonia from digested denatured liquid sludge containing ammonia and suspended solids, the method comprising feeding the liquid sludge to a tank which is in fluid communication with an interior of a hollow stripping tower;

flashing the liquid sludge into the tank producing stripping gas which flows to the stripping tower's interior, with the tower being at a positive pressure, adjusting the pH of the liquid sludge in the tank to at least 9, agitating the liquid sludge in the tank, and then feeding the liquid sludge from the tank to the stripping tower, flowing the liquid sludge to an interior wall of the stripping tower forming a downward flowing film of sludge on the wall interior, flowing stripping gas upwardly past the film, stripping ammonia from the liquid sludge and forming a vapor containing ammonia and stripping gas, disengaging liquid sludge from the vapor in a disengaging zone in the stripping tower, producing disengaged liquid sludge, and sensing ammonia concentration level of the disengaged liquid sludge through the stripping tower to remove at least 99% by weight of the ammonia.

* * * * *